United States Patent
Hunzinger

(10) Patent No.: US 7,146,164 B2
(45) Date of Patent: Dec. 5, 2006

(54) INTELLIGENT BASE STATION ANTENNA BEAM-STEERING USING MOBILE MULTIPATH FEEDBACK

(75) Inventor: Jason F. Hunzinger, Carlsbad, CA (US)

(73) Assignee: Denso Corporation, Kariya (JP)

(*) Notice: Subject to any disclaimer, the term of this patent is extended or adjusted under 35 U.S.C. 154(b) by 667 days.

(21) Appl. No.: 10/032,143

(22) Filed: Dec. 19, 2001

(65) Prior Publication Data

US 2002/0094843 A1    Jul. 18, 2002

Related U.S. Application Data

(60) Provisional application No. 60/257,261, filed on Dec. 20, 2000.

(51) Int. Cl.
*H04Q 7/20* (2006.01)

(52) U.S. Cl. ............... 455/423; 455/67.11; 455/562.1; 370/334; 370/335; 375/267; 375/299

(58) Field of Classification Search ............... 455/101, 455/133, 105, 69, 562.1, 561, 423, 67.11; 370/337, 334, 335, 252; 375/299, 267
See application file for complete search history.

(56) References Cited

U.S. PATENT DOCUMENTS

| | | | |
|---|---|---|---|
| 6,233,456 B1 * | 5/2001 | Schiff et al. ................. | 455/439 |
| 6,398,867 B1 * | 6/2002 | D'Evelyn et al. ............. | 117/11 |
| 6,456,610 B1 * | 9/2002 | Briley ......................... | 370/337 |
| 6,498,939 B1 * | 12/2002 | Thomas .................... | 455/562.1 |
| 6,549,780 B1 * | 4/2003 | Schiff et al. ................. | 455/439 |
| 6,584,161 B1 * | 6/2003 | Hottinen et al. ............ | 375/299 |
| 6,636,743 B1 * | 10/2003 | Vicharelli et al. ........ | 455/456.1 |
| 6,671,499 B1 * | 12/2003 | Ylitalo et al. ............... | 455/101 |
| 6,697,642 B1 * | 2/2004 | Thomas .................... | 455/562.1 |
| 6,754,286 B1 * | 6/2004 | Hottinen et al. ............ | 375/299 |
| 2001/0006898 A1 * | 7/2001 | Bae ............................ | 455/522 |
| 2002/0077140 A1 * | 6/2002 | Monogioudis et al. ...... | 455/522 |
| 2004/0014429 A1 * | 1/2004 | Guo ............................ | 455/73 |

* cited by examiner

*Primary Examiner*—Danh Cono Le
(74) *Attorney, Agent, or Firm*—Harness, Dickey & Pierce, PLC

(57) ABSTRACT

This invention relates to wireless communications devices, and more particularly to search processing load reduction methods for wireless communications based on CDMA.

18 Claims, 6 Drawing Sheets

Reverse-Link Multipath Feedback Message (EXAMPLE)

[Header]
Number of Pilots (optional)
    Reference Pilot 1 PN (optional)
        Reference path strength (serves as a reference for relative strength)
        Number of Multipaths
            Path 2 strength (or relative strength)
            Path 2 relative position
            Path 3 strength (or relative strength)
            Path 3 relative position
            [...]
    Pilot 2 PN (optional)
        Reference path strength (serves as a reference for relative strength)
        Number of Multipaths
            Path 2 strength (or relative strength)
            Path2 relative position
            Path 3 strength (or relative strength)
            Path 3 relative position
            [...]
[...]

NOTE: Alternatively, the Number of Pilots and pilot PNs may be omitted (see optional qualifier and instead be implicitly known by including all active set plots in the order in which they were received in the last handoff message from the infrastructure.

Figure 6

INTELLIGENT BASE STATION ANTENNA BEAM-STEERING USING MOBILE MULTIPATH FEEDBACK

CROSS-REFERENCE TO RELATED APPLICATIONS

The present invention claims priority from U.S. provisional patent application Ser. No. 60/257,261 entitled "Intelligent Base Station Antenna Beam-steering using Mobile Multipath Feedback" filed Dec. 20, 2000, the contents of which are incorporated herein by reference.

TECHNICAL FIELD

The present invention relates, generally, to communication network management and more particularly to methods and apparatus for Adaptive Antennas and Beam-steering for connections between a mobile station, such as a cellular or PCS phone, and a wireless communication infrastructure (network).

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

SUMMARY

This invention consists of intelligent base-station (sector) antenna beam-steering using feedback from mobile stations. This enhances antenna beam steering effectiveness and efficiency.

DESCRIPTION OF DRAWINGS

The features, objects, and advantages of the present invention will become more apparent from the detailed description set forth below when taken in conjunction with the drawings in which like reference characters identify correspondingly throughout and wherein:

FIG. 6 shows a signaling format for mobile station feedback.

DETAILED DESCRIPTION

Figure 1:
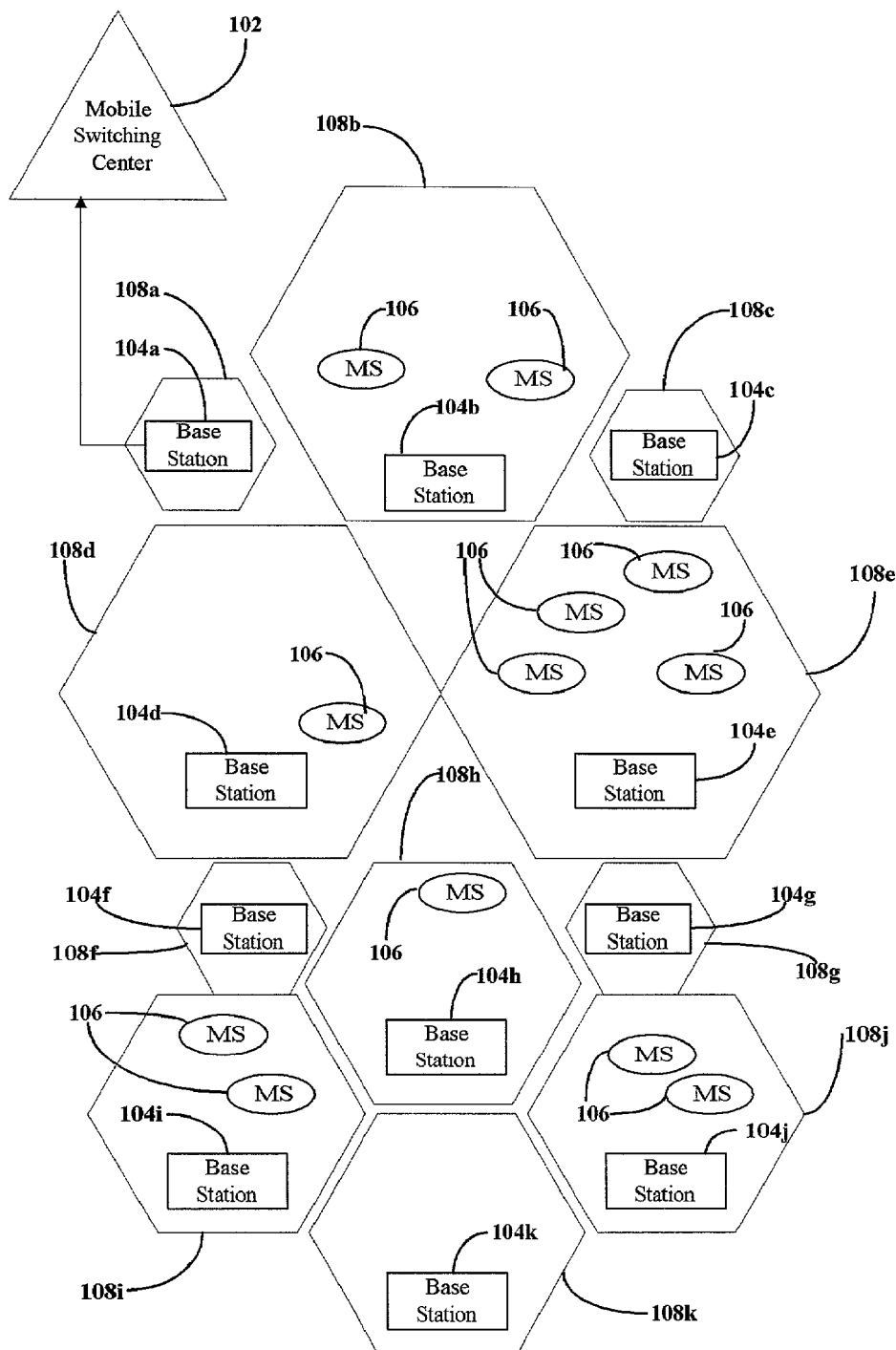
FIG. 1 is a diagram of a cellular telephone system illustrating mobile stations in relative positions to base stations.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

Figure 2:
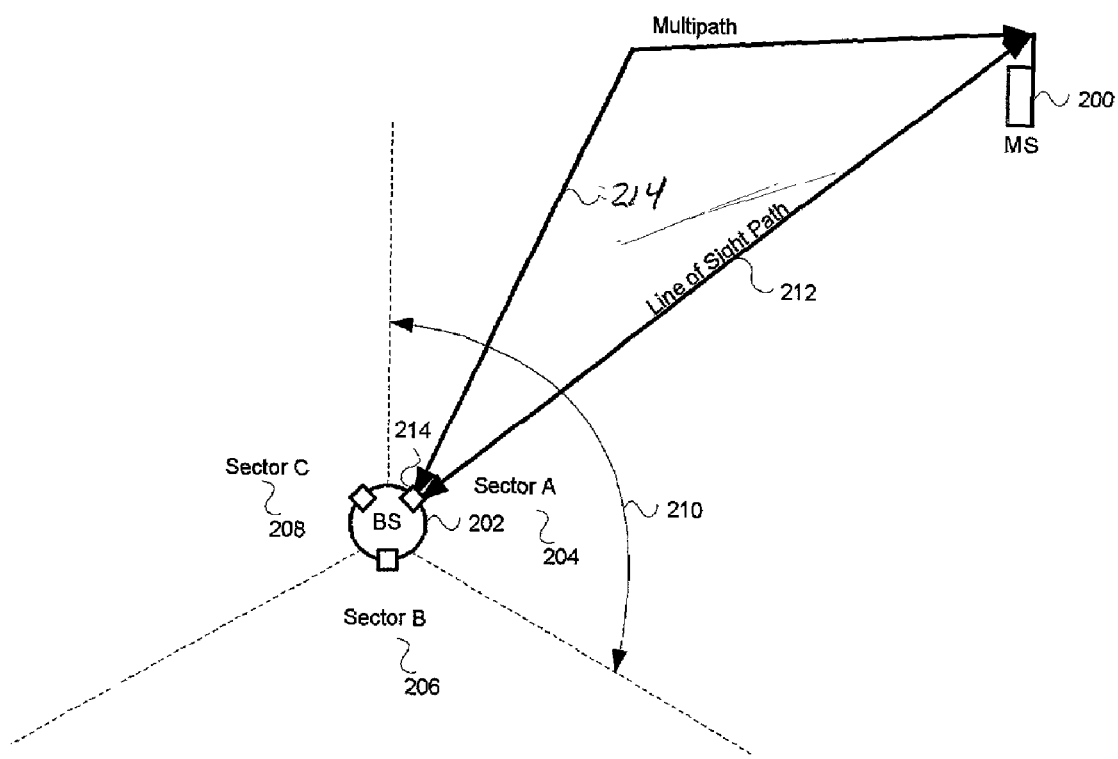
FIG. 2 illustrates the multiple signal paths between a sector antenna at a base station and a mobile station.

FIG. 2 illustrates multiple signal paths between a sector antenna at a base station and a mobile station. This invention consists of intelligent base-station (sector) antenna beam-steering using feedback from the mobile stations. A mobile station 200 may provide initial location information to a base-station 202 in order to initialize a beam-steering algorithm. The base station 202 may initially transmit by adapting the antenna transmission pattern to focus on the lineof-sight 212 to the location of the mobile station 200. However, due to blocking or suppression of the line-of-site path 212, other multipaths due to reflections may be stronger than the direct line-of-sight path. For example, a sector A transmitter (214) may transmit a signal for a mobile station 200 in sector A 204 defined by the angle 210. The multipath signal 214 is likely to be delayed from the signal traveling along the direct link of sight path 212.

Figure 3:
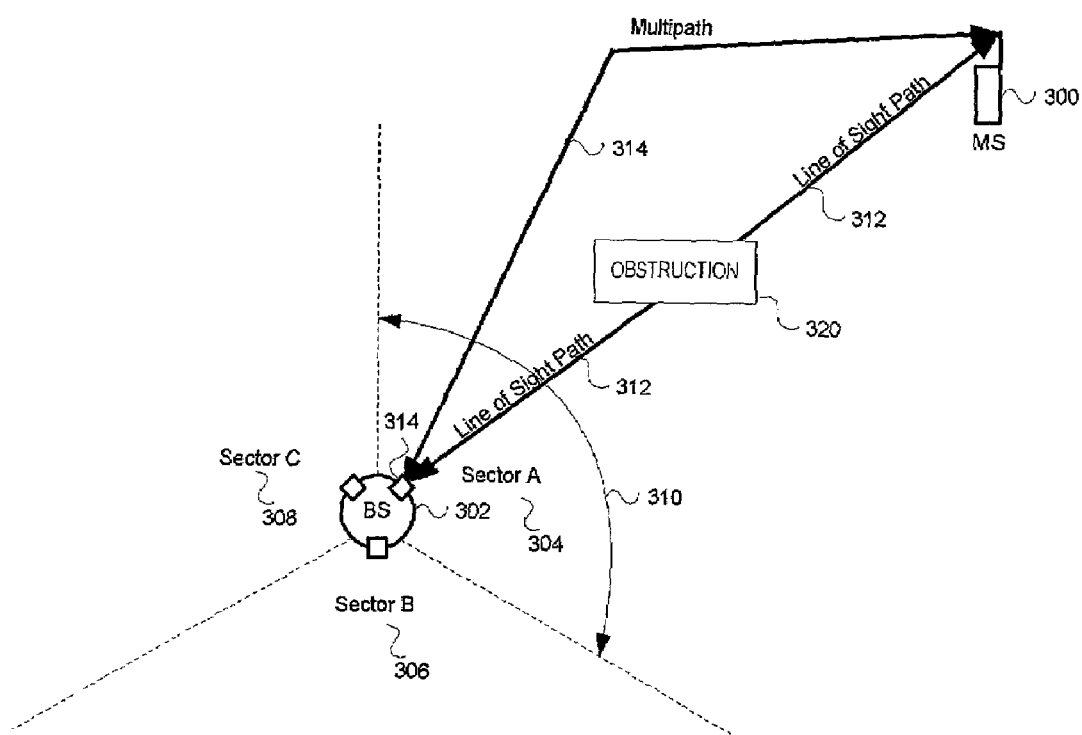
FIG. 3 illustrates the obstruction of the line of sight path between a sector antenna at a base station and a mobile station.

FIG. 3 illustrates an obstruction of the line of sight path between a sector antenna at a base station and a mobile station. However, the base station may not know that the obstruction 320 exists unless the mobile terminal 300 provides feedback. The mobile station 300 can provide feedback to the base station 302 including the number of multipaths, relative or absolute strengths of each multipath, the number that it can demodulate in parallel, and the relative phase offset of each. The mobile may omit some of this information such as relative phase offset because it may not be practically useful due to the unknown (and possibly irrelevant) nature of the environment and the actual paths of each multipath. Note that the mobile may provide this feedback only when there is a change in conditions, multipaths (offset, number, strength, etc) or periodically, regularly, or upon demand. Most important is the relative strength. If the earliest multipath is strongest then there is less of a likelihood that the base-station need investigate non line-of-sight paths since the earliest is likely to be the direct path and is strongest. Alternatively, if the mobile notifies the base-station of a stronger non-earliest path, then the base station may use the same beam (or another beam) to sweep the sector.

For example, in FIG. 3, if the obstruction 320 reduces the signal strength of the line of sight path 312, then the multipath signal 314 may be stronger even though it is delayed. The mobile station 300 transmits feedback informing the base station of the two receivable paths 312 and 314 and their individual or relative strengths and delays. Optionally, the mobile station 300 may simply send feedback to the base station 302 with an indication that the earliest path 312 is not the strongest. This could initiate a beam sweep at the base station 302 to determine the best antenna array configuration.

The base station 302 can time or schedule a beam sweep of the sector specifically such that the mobile may monitor the multipath conditions at known times and send feedback. The base station 302 can then correlate the feedback with its schedule of the sweep(s). For example the base station 302 may start a clock-wise sweep stepping X degrees at each step for a period of N seconds. The feedback from the mobile station 300 during each time period (either sent individually or as an collection after the sweep) can be used to determine which period/angle was the best.

The base station 302 may use any number of mechanisms for the sweeping as long as it can correlate the results of the mobile station 300 and time-stamps with its own sweep actions. This may put a limit on how fast the sweep can be done because of:

1) how much time the mobile station 300 can spend searching any given pilot without impacting performance.

2) the granularity of time that the mobile station 300 can execute such searches for multipath components.

3) the stability/consistency with which the mobile station 300 can execute those searches during a sweep.

4) the time-delay associated with providing feedback to the base-station 302.

The base station 302 may request capabilities from the mobile station 300, or the mobile station 300 may provide these capabilities to the base station 302 at some initialization time, such as the start of a call or registration. The base station 302 may then request specific timing/scheduling of multipath searches to facilitate its specific sweep algorithm and parameters. It could also modify its algorithm or parameters to suit a mobile or set of mobiles. Alternatively, the base station 302 may do sweeps for an aggregate set of mobiles and give all the mobile stations 300 the same instructions and request feedback from each for the same sweep. The base station 302 may then use the feedback to create multiple beams to different mobile stations 300 (for example it could beam dedicated channels only and not common channels).

The base station 302 may execute a sweep using one or more beams while maintaining another beam(s) for demodulation (i.e. for non-sweep purposes) and use the relative differences between mobile feedback results to make decisions.

Figure 4:
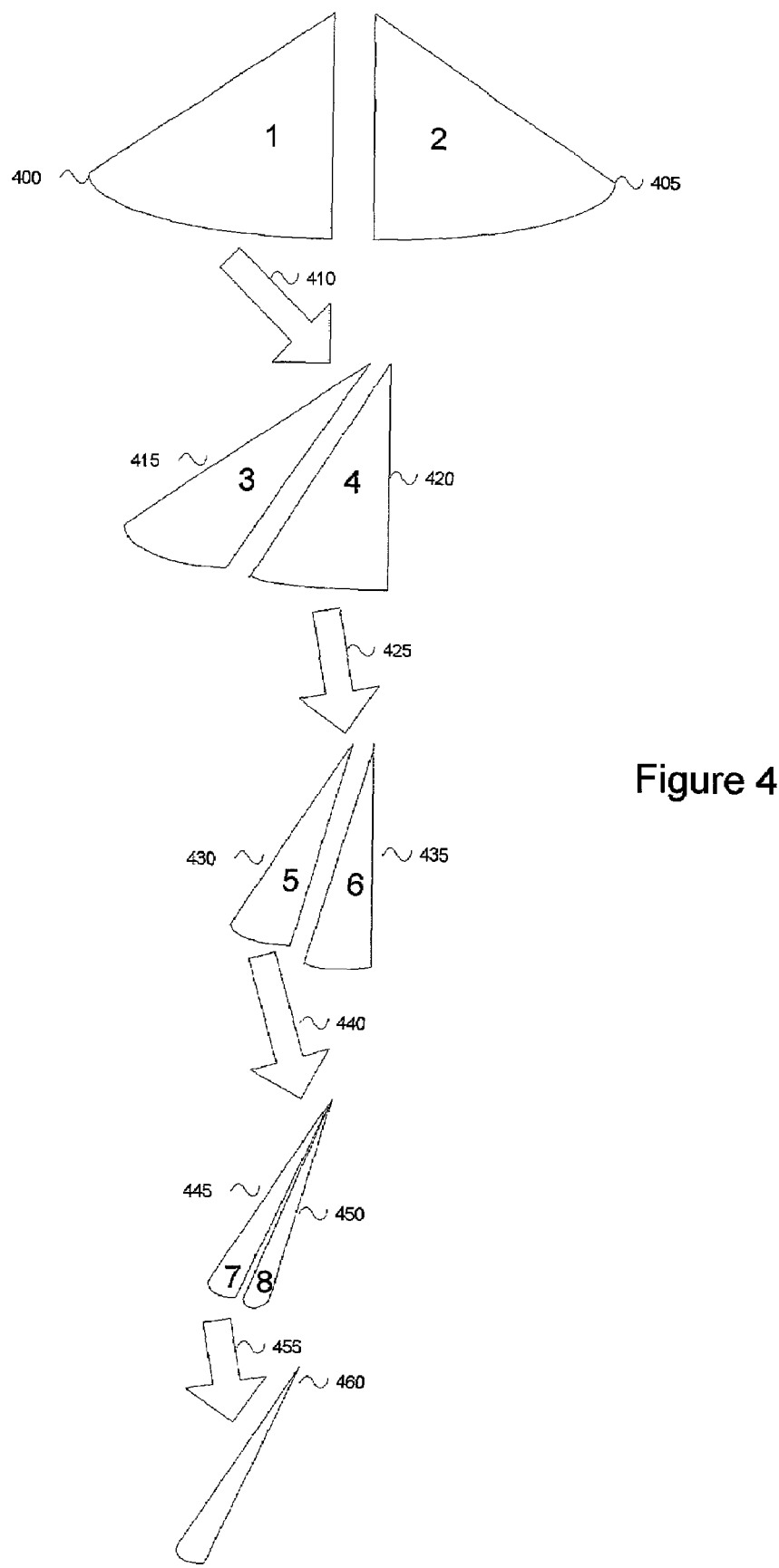
FIG. 4 shows a binary sequence of varying-size and orientation sector sweeps.

FIG. 4 shows a binary sequence of varying-size and orientation sector sweeps. The base station 302 could execute sweeps in multiple sessions or steps. For example, it could use a "wide" beam pattern to do a binary search and narrow the beam in subsequent steps. For example, the base station 302 could break the sector roughly into 2 angles (i.e. 1 400 and 2 405 in FIG. 4) and maintain a beam at one angle for a period and then at the other angle for a period. Based on feedback from the mobile station 300, the base station 302 would then select the best area and break that area into two and proceed in this step-wise manner. For example, the wide angle 1 resulted in the best feedback from the mobile station 300 and thus the base station selected angle 1 400 to break down into angles 3 415 and 4 420. A wide area search is recommended when the beam angle and mobile station 300 receive performance are correlated but have a relationship function with local maximas. After a number of iterations 1 through 8, the sector is able to focus a narrow beam 460 in the most optimal direction.

Alternatively a left/right algorithm would work as follows: The base station 302 can also track a mobile station 300 by adapting each beam using feedback from the mobile station 300. The base station may use another beam (other than the one used for demodulation) to point just left and then just right (or vise-versa) of the main beam. The mobile station 300 time-stamped feedback can then be used to adjust the main beam either left or right. This process can be continuous and form a closed-loop forward-link beam-steering algorithm.

The invention includes signaling methods to communicate the feedback from the mobile station to the base station(s) 302.

The mobile station 300 may provide closed loop feedback using one-bit punctured on a reverse link channel. This bit will indicate better/worse. The time period may be pre-programmed, or determined by base-station configuration or mobile algorithm. A "Better" bit value means better than the last period. A "Worse" bit value means worse than the last period. This bit could be provided for one-pilot or as an aggregate measure. Alternatively one-bit could be provided per-active pilot.

The mobile station 300 may provide specific information for each pilot in terms of the number of multipaths, relative strength, etc and may provide each element of information separately or if it changes and on a period or schedule pre-determined, pre-programmed, or communicated via the base-station 302.

The mobile station 300 may use a single bit to signify if the strongest multipath component is the earliest or not. For example a "1" indicates the strongest is the earliest and a "0" indicates the strongest is not the earliest or vice-versa. The base-station 302 uses this, as described above, to determine if and how sweeping shall be done and possibly how "wide" the beam should be used and possible other characteristics of the beam or form of the "beam".

Figure 5:
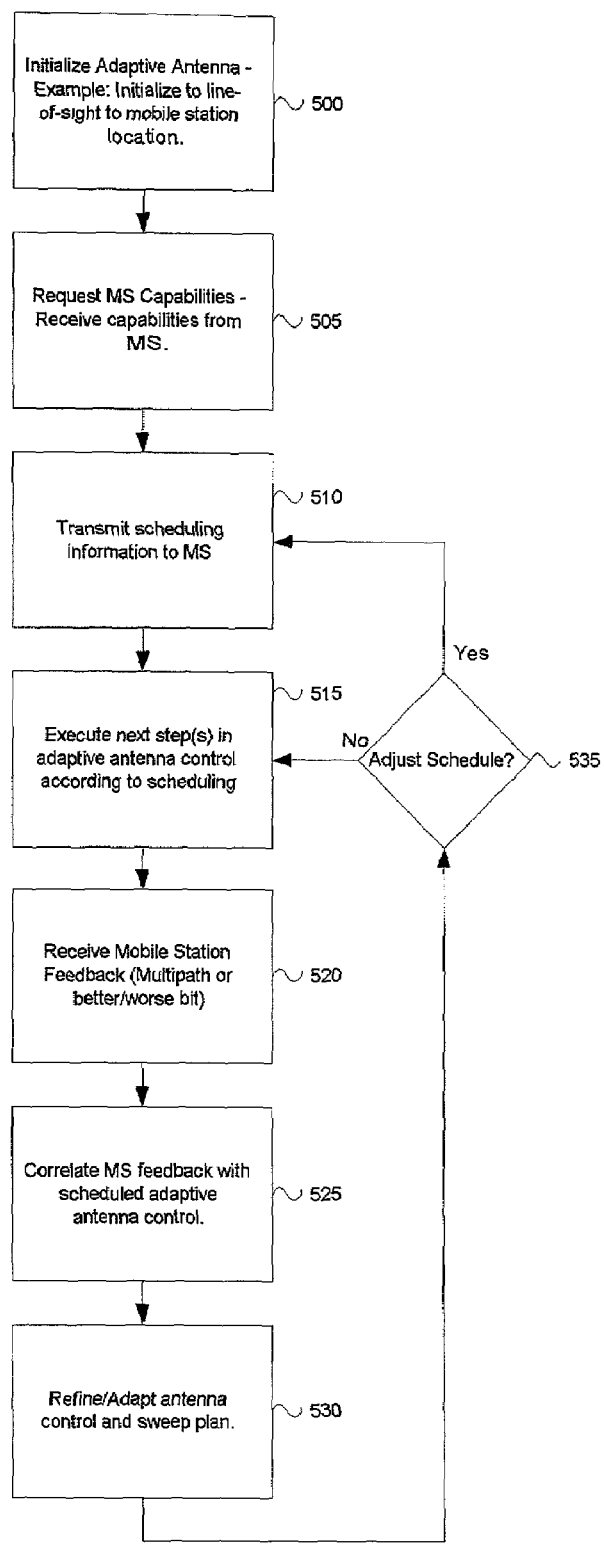
FIG. 5 is a flow diagram of an embodiment of the base station sweep process.

FIG. 5 is a flow diagram of an embodiment of the base station 302 sweep process. The base station 302 initializes the process in block 500 by, for example, the antenna angle to the line-of-sight to the mobile station or by using a wide angle as described above. The base station 302 may use initial instructions or location information from the mobile station 300 to do this. The base station 302 may then request the mobile station's adaptive beam steering feedback capabilities as shown in block 505. Alternatively these capabilities may be known or determined at an earlier time.

The base station 302 then proceeds to block 510 where it sends its intended schedule for beam-steering. The base station 302 does not need to send the actual schedule but may simply send the periodicity of adaptation changes or beam sweeps as described above.

The base station 302 process proceeds to step 515 where it executes the next antenna control step according to its schedule. The mobile station 300 provides feedback either every step or periodically, or on a queried basis as described in block 520. The base station 302 correlates the feedback with the antenna configuration schedule 525 to refine and adapt the antenna control and sweep plan 530. The base station 302 may then consider adjusting the schedule as shown in block 535.

FIG. 6 shows a sample signaling message format that may be used for mobile station feedback. Of course, other message formats may be used without departing from the spirit of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. A method for beam steering, comprising:
    measuring received signal characteristics of the beam;
    providing feedback based on the signal characteristics; and
    adapting the beam based on the feedback information; wherein
    the feedback includes relative strength information regarding a first signal with respect to a second signal; and
    the feedback is a one-bit punctured on a reverse link channel which indicates whether an earliest received signal is the strongest.

2. The method of claim 1, further comprising using the feedback to indicate quality of a current signal compared to a previous signal.

3. The method of claim 1, further comprising transmitting the number of multipaths as part of the feedback information.

4. The method of claim 1, further comprising transmitting the feedback information on a pre-determined schedule.

5. The method of claim 1, further comprising transmitting the feedback information when requested.

6. The method of claim 1, further comprising steering the beam to ensure a strong signal strength.

7. A method of determining a beam transmission path comprising:
    transmitting a beam sweep through a sector;
    determining signal conditions for the beam throughout the sweep; and
    providing feedback based on the signal conditions indicating a preferred transmission path; wherein
    the feedback includes relative strength information regarding a first signal with respect to a second signal; and
    the feedback is a one-bit punctured on a reverse link channel which indicates whether an earliest received signal is the strongest.

8. The method of claim 7, further comprising correlating the feedback with a sweep schedule.

9. The method of claim 7, wherein the feedback includes a relative strength indicator; and further comprising comparing the relative strength indicator of the signal throughout the beam sweep.

10. The method of claim 7, wherein the feedback indicates a quality of a current signal compared to a previous signal.

11. The method of claim 7, further comprising transmitting a plurality of beam sweeps, wherein a first of the plurality of beam sweeps is for demodulation.

12. The method of claim 7, further comprising comparing a relative difference between feedback results to determine a preferred transmission path.

13. A wireless communication system comprising:
    a base station which transmits a signal; and
    one or more mobile stations which receive the transmitted signal and measures one or more characteristics of the received signal and provide feedback based on the one or more signal characteristics, wherein the base station adapts the beam based on the feedback; wherein
    the feedback includes relative strength information regarding a first signal with respect to a second; and
    the feedback is a one-bit punctured on a reverse link channel which indicates whether an earliest received signal is the strongest.

14. The wireless communication system of claim 13, wherein the feedback indicates a quality of a current signal compared to a previous signal.

15. The wireless communication system of claim 13, wherein a number of multipaths is provided as part of the feedback information.

16. The wireless communication system of claim 13, wherein the feedback information is transmitted on a pre-determined schedule.

17. The wireless communication system of claim 13, wherein the feedback information is transmitted when requested.

18. The wireless communication system of claim 13, wherein the base station steers the beam to ensure a strong signal strength.

* * * * *